(No Model.)
W. STANLEY, Jr.
SELF EXCITING ALTERNATE CURRENT ELECTRIC GENERATOR.
No. 450,641. Patented Apr. 21, 1891.
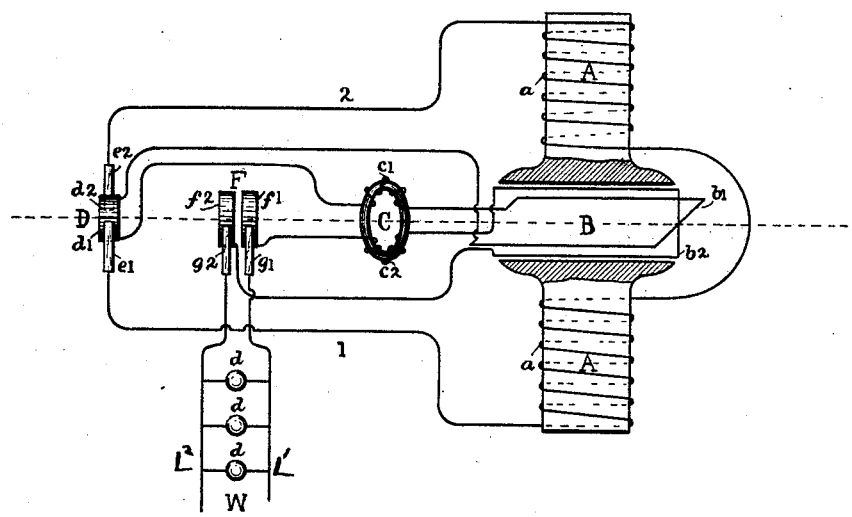
WITNESSES:
George Brown Jr.
Hubert C. Tener
INVENTOR,
William Stanley Jr.
Pope, Edgecomb & Terry
Att'ys.

UNITED STATES PATENT OFFICE.

WILLIAM STANLEY, JR., OF GREAT BARRINGTON, MASSACHUSETTS, ASSIGNOR TO THE WESTINGHOUSE ELECTRIC AND MANUFACTURING COMPANY, OF PITTSBURG, PENNSYLVANIA.

SELF-EXCITING ALTERNATE-CURRENT ELECTRIC GENERATOR.

SPECIFICATION forming part of Letters Patent No. 450,641, dated April 21, 1891.

Application filed October 19, 1888. Serial No. 288,550. (No model.)

*To all whom it may concern:*

Be it known that I, WILLIAM STANLEY, Jr., a citizen of the United States, residing in Great Barrington, county of Berkshire, and State of Massachusetts, have invented a certain new and useful Improvement in Self-Exciting Alternate-Current Electric Generators, (Case No. 242,) of which the following is a specification.

The invention relates to the class of alternate-current electric generators in which the current required for exciting the field-magnet is derived from the armature of the machine.

The object of the invention is to provide means for regulating the current automatically and maintaining a constant or an increasing or decreasing difference of potential upon the work-circuit, as may be desired, throughout variations of load.

In carrying out the invention an armature is wound with two sets of coils, one of which has its terminals connected with the field-magnet coils, while the other set of coils is connected with the work-circuit. An electric converter has one coil connected in the circuit of the armature-coils supplying the field-magnet and its other coil in the circuit of the armature-coil supplying the work-circuit. This converter may with advantage be carried upon and revolve with the armature-shaft. A rectifying-commutator is interposed in the field-magnet circuit for the purpose of rendering the currents delivered to the field-magnet coils continuous in direction.

In another application, Serial No. 288,551, filed October 19, 1888, the method of generating and regulating electric currents herein described is claimed.

The invention will be described in detail in connection with the accompanying drawing, which is a theoretical diagram illustrating the organization of the apparatus.

Referring to the figure, A represents a field-magnet of any suitable character. It is wound with coils $a$, and currents traversing these coils serve to maintain a field of force for the armature. It is desired that this field of force shall vary with or be dependent upon the current being consumed in the work-circuit.

The armature B is provided with two sets of armature-coils $b'$ $b^2$. The two sets of coils are here represented as being placed at right angles to each other, for purposes which will hereinafter appear. The coil $b'$ has one terminal connected, through the coils $c'$ of an electric converter or inductorium C, to one plate B' of a rectifying-commutator D. The converter is mounted upon the armature-shaft and revolves therewith. The other terminal of the coil $b'$ is connected directly with the plate $b^2$ of the commutator. Two commutator-brushes $e'$ $e^2$ make alternate connections with the commutator-plates. These brushes are respectively connected with the conductors 1 and 2, leading to the field-magnet coils. One terminal of the second set of armature-coils $b^2$ is connected through the second coil $c^2$ of the converter C with a contact or collecting ring $f'$ of the collector F. The other terminal of the coil $b^2$ is connected with the remaining ring $f^2$ of the collector. The brushes $g'$ $g^2$, respectively applied to the collector-rings, are connected to the main lines L' L², supplying a work-circuit W, which is here shown as operating incandescent electric lamps $d$ $d$; but motors or apparatus of the same character may be supplied thereby.

The operation of the apparatus is as follows: Considering, first, that the work-circuit is open and no work is being done, then the revolution of the armature will cause an electro-motive force to be developed in the coil $b'$ and a current will be caused to traverse the coil $c'$ of the converter C, passing thence to the field-magnet. This current will be opposed by a counter electro-motive force developed in the converter in a manner well understood. The current traversing the field-magnet coils will therefore be comparatively small. If now the work-circuit is closed, a current will be allowed to traverse that circuit dependent upon the resistance encountered. This current also traverses the coil $c^2$ of the converter. The two currents being generated in coils placed at right angles to each other, will have their phases ninety degrees apart. I have discovered that when two currents having their phases ninety degrees apart traverse separate coils of an electric converter they tend to mutually destroy the counter electro-motive force or self-induction of each other. When, therefore, currents traverse the coil $c^2$, the effective counter electro-motive force or self-induction opposed to the passage of current through the coil $c'$ is diminished and more current is allowed to flow through that coil. Moreover, the presence of the current in the coil $c'$ serves to neutralize the opposing force, which would otherwise tend to prevent the passage of current through the coil $c^2$. As the difference of potential at the terminals of the coil $c'$ decreases, that at the terminals of the field-magnet increases, and vice versa. Therefore more current will be allowed to flow through the field-magnet coils as the resistance of the work-circuit is diminished, thus increasing the field of force of the generator with an increase of load. When the resistance of the work-circuit is increased by lessening the work being done, less current will flow through the coil $c^2$, and consequently less current will flow through the coil $c'$, and thus the strength of the field-magnet will be decreased correspondingly. The coil $c'$ is preferably wound with fine wire and the coil $c^2$ with thick wire, the relative sizes and lengths being proportioned to allow the proper currents to be transmitted through the two circuits.

It will be evident, therefore, from the foregoing description that by properly proportioning the converter and the coils and the core of the armature and field-magnet, the difference of potential upon the work-circuit W may be maintained approximately constant throughout variations in work, or the difference of potential may be made to increase according to any predetermined law under an increase of load. The organization also serves to partially compensate for variations in the speed at which the generator is driven, for as the electro-motive force tends to increase by reason of an increase in the rate of revolution of the armature the self-induction of the coil $c'$ increases on account of the greater number of alternations per minute, thus preventing the current in the field-magnet from increasing proportionately to the increase in the electro-motive force given by the armature.

One advantage resulting from placing the coils at right angles to each other is that the diameter of commutation on the part of the coils $b'$ is not affected by the current flowing in the coil $b^2$, and consequently the diameter of commutation or position of the brushes will remain constant for all loads and no adjustment is necessary.

I claim as my invention—

1. In a self-exciting alternate-current electric generator, the combination of two or more independent sets of armature-coils, an electric converter wound with two independent coils, one connected in series with the field-magnet coils of the generator, the other in series with the work-circuit, each arranged to lessen the self-induction of the other, said converter being mounted upon the armature-shaft and revolving therewith, and a rectifying-commutator interposed in the field-magnet circuit.

2. The combination of two sources of alternating electric currents, the phases of which are approximately ninety degrees apart, and an electric converter having its respective coils connected in the respective circuits of said sources, whereby the currents traversing one circuit are caused to rise and fall under the influence of an increase or decrease of current in the other circuit, and coils for maintaining the field of force of the sources connected in circuit with one of the circuits.

3. The combination of two sources of alternating electric currents, the phases of which currents are ninety degrees apart, an electric converter wound with two coils respectively connected in series with said sources, of two circuits supplied with currents from said sources, respectively, the currents traversing one of said circuits serving to vary the electro-motive force of the currents from said sources, and circuit-connections from one of said circuits, including the exciting-coils of said sources.

4. The combination, with an alternate-current electric generator, of an electric converter mounted upon the axle of the armature and moving therewith, and electrical connections through the coils of the converter.

5. The combination, with an alternate-current electric generator having independent sets of armature-coils, of an electric converter mounted upon the armature-shaft and circuit-connections from the respective armature-coils through the coils of said converter.

6. The combination, with an alternate-current electric generator having two independent sets of armature-coils, of an electric converter mounted upon the armature-shaft and circuit-connections from the respective armature-coils through the coils of said converter, and circuit-connections from one of said coils to a rectifying-commutator through which currents are supplied to the field-magnet of the generator.

In testimony whereof I have hereunto subscribed my name this 1st day of April, A. D. 1889.

WILLIAM STANLEY, Jr.

Witnesses:
CHARLES A. TERRY,
C. C. WOLFE.